United States Patent Office 3,701,657

Patented Oct. 31, 1972

3,701,657

PROCESSING OF PRESENSITIZED PHOTOLITHOGRAPHIC PRINTING PLATES

Brian Joseph Moore and Leonard James Watkinson, Yorkshire, England, assignors to W. H. Howson Limited, Yorkshire, England No Drawing. Filed May 8, 1968, Ser. No. 727,656
Claims priority, application Great Britain, May 18, 1967, 23,249/67
Int. Cl. G03c *5/00*
U.S. Cl. 96—35 5 Claims

ABSTRACT OF THE DISCLOSURE

This disclosure relates to developer solutions suitable for developing exposed presensitized photolithographic printing plates, which solutions comprise a solvent for the areas of presensitized layer to be removed from the printing plate and a surface active agent, the volumetric ratio of solvent to surface active agent being considerably higher than conventionally used, whereby the efficacy of the developer solution is considerably enhanced.

This invention relates to the processing of presensitized photolithographic printing plates, and more particularly to developing solutions for developing exposed presensitized photolithographic printing plates, particularly plates of the type described in our copending U.S. application No. 639,612, now abandoned.

Developing solutions for developing exposed presensitized photolithographic printing plates are known which contain small amounts of a surface active agent in a solvent for the areas of the coating to be removed, for example 2% by weight of the surface active agent based on the solvent. Such solutions are disclosed in our copending U.S. application No. 474,936, now Pat. No. 3,399,994, and in British specification No. 1,102,952.

It has now very surprisingly been found, in accordance with the invention, that if the concentration of surface active agent in the solvent is considerably increased, the efficacy of the developing solution is considerably enhanced. At the same time, it has been found possible, when it is desired that the developing solution contains a desensitizer, to replace the hydrophilic colloid normally used as desensitizer in the known developing solutions with a desensitizer of low molecular weight, for example citric acid, oxalic acid, phosphoric acid or sulphuric acid, without thereby significantly decreasing the efficacy of the developing solution.

Accordingly, the present invention provides a developer solution suitable for developing an exposed presensitized photolithographic printing plate, which comprises a solvent for the areas of the presensitized layer to be removed from the printing plate and a surface active agent, the ratio of solvent to surface active agent being in the range of from 3:2 to 9:1, preferably in the range of from 2:1 to 5:1.

Preferably, the solution further comprises a low molecular weight desensitizer. In addition, the solution may further comprise a colourant, but this is neither necessary nor advisable when the presensitized coating on the printing plates is itself coloured. Suitable colourants for use in the developing solution of the invention are, for example, basic oil-soluble dyes such as Solvent Red, Colour Index No. 24, Solvent Blue, Colour Index No. 36, spirit soluble Oracet red 3B, Colour Index No. 53, Oracet scarlet 2B, Colour Index No. 14, Oracet blue 2R, Colour Index No. 21 and Oracet blue, Colour Index No. 19, and dispersions of pigments such as Pigment Red, Colour Index No. 12, and Pigment Blue, Colour Index No. 15.

The function of the solvent in the solution is to dissolve the unhardened coating in the unexposed non-image areas of the plate and may or may not be water miscible. Exemplary of solvents which may be used in the invention are glycol ether esters, such as 2-methoxy-ethyl acetate, 2-ethoxy-ethyl acetate, 2-isopropoxy-ethyl acetate and 3-methoxy-butyl acetate; amides, such as dimethyl formamide and dimethyl acetamide; alcohols such as tetrahydrofurfuryl alcohol, 3-methoxy-butanol and benzyl alcohol; hydrocarbons such as toluene and xylene; chlorinated hydrocarbons such as trichlorethylene and perchlorethylene and chlorobenzene; and tetrahydrofurfuryl acetate, diethylene glycol monomethyl ether and diethylene monoethyl ether acetate; either singly or two or more in admixture. The surface active agent used in the invention may be of the anionic, non-ionic or cationic type and it is believed that the surface active agent keeps the resin which is removed from the non-image areas of the plates in suspension, thus preventing redeposition of the removed resin onto those areas from which the resin has been removed, when the developing solution is washed off the plate, for example with water, after development. Exemplary of surface active agents suitable for use in the invention are alkyl aryl sulphonic acids, tertiary amine condensation products of fatty amines and ethylene oxide, polyoxyethylene sorbitan monopalmitate, polyoxyethylene glyceride ethers, and polyoxyethylene condensates of alcohols, higher fatty alcohols and alkyl phenols, such as polyoxyethylene oleyl ether and polyoxyethylene tridecyl ether. Clearly, the surface active agent must be compatible with the solvent or solvent combination selected to remove unexposed resin from the plate and although complete compatibility has been initially achieved, no reaction should take place on storage, e.g. by having a mildly basic solvent or surface active agent with an acidic desensitizing compound.

Low molecular weight desensitizers suitable for use in the invention to desensitize the non-image areas of the plates are, for example, citric acid, oxalic acid, phosphoric acid or sulphuric acid, but a high molecular weight desensitizer, such as carboxymethyl cellulose, could be used if desired, although this is not preferred.

When using the invention, a printing plate, for example a presensitized photolithographic plate having a coloured photopolymerizable resin thereon as described in our copending U.S. patent application No. 639,612 is exposed under a photographic negative to actinic radiation from a source such as a carbon arc, an ultraviolet lamp or a pulsed xenon lamp, for sufficient time to harden the exposed areas of the coatings, for example, an exposure for 3 minutes to a 50 amp. carbon arc source at a distance of 3 feet. The plate is then treated with a developer solution according to the invention, for example by swabbing, until the unexposed portions of the resin on the plate are removed to leave a clear image on the plate. The plate may then be washed with water and put on a printing machine or gummed and dried prior to storage. Alternatively, it is possible to merely wipe off excess developing solution and leave the plate for several days in this condition, which does not cause damage to the plate, and thereafter merely putting the plate onto a printing machine, wiping with a wet sponge, gumming up and then printing.

The following examples illustrate the formulation of developing solutions of the invention.

EXAMPLE 1

| | Cc. |
|---|---|
| Tetrahydrofurfuryl acetate | 30 |
| Pentrone A8 | 10 |
| Phosphoric acid S.G. 1.75 | 0.1 |

Pentrone A8 is an alkyl aryl sulphuric acid amine salt. The word "Pentrone" is a trademark.

EXAMPLE 2

| | Cc. |
|---|---|
| 2-methoxy-ethyl acetate | 100 |
| Texafor D 1 | 50 |
| Phosphoric acid S.G. 1.75 | 0.1 |

Texafor D 1 is a polyoxyethylene condensate of a glyceride oil. The word "Texafor" is a trademark.

EXAMPLE 3

| | Cc. |
|---|---|
| Dimethyl formamide | 100 |
| Ethomeen C 25 | 25 |
| Phosphoric acid S.G. 1.75 | 0.1 |

Ethomeen C 25 is a condensate product of a fatty coco amine and polyethylene oxide. The word "Ethomeen" is a trademark.

EXAMPLE 4

| | | |
|---|---|---|
| 2-ethoxy-ethyl acetate | cc. | 100 |
| Polyoxyethylene sorbitan monopalmitate | cc. | 50 |
| Citric acid | g. | 0.5 |

EXAMPLE 5

| | | |
|---|---|---|
| Xylene | cc. | 100 |
| Polyoxyethylene sorbitan monopalmitate | cc. | 25 |
| Phosphoric acid S.G. 1.75 | cc. | 0.1 |

EXAMPLE 6

| | | |
|---|---|---|
| 3-methoxy-butyl acetate | cc. | 100 |
| Polyoxyethylene sorbitan monopalmitate | cc. | 50 |
| Citric acid | g. | 0.5 |

EXAMPLE 7

| | | |
|---|---|---|
| Tetrahydrofurfuryl alcohol | cc. | 400 |
| Polyoxyethylene sorbitan monopalmitate | cc. | 50 |
| Phosphoric acid S.G. 1.75 | cc. | 0.2 |

EXAMPLE 8

| | | |
|---|---|---|
| Tetrahydrofurfuryl alcohol | cc. | 150 |
| 2-methoxy-ethyl acetate | cc. | 400 |
| Texafor D 1 | cc. | 100 |
| Sulphuric acid 98% w./v. | cc. | 4 |

EXAMPLE 9

| | | |
|---|---|---|
| Dimethylformamide | cc. | 60 |
| 3-methoxy-butyl acetate | cc. | 20 |
| Polyoxyethylene sorbitan monolaurate | cc. | 20 |
| Phosphoric acid S.G. 1.75 | cc. | 0.1 |

Presensitized photolithographic printing plates were prepared as described in the example of copending U.S. patent application No. 639,612 and the plates so prepared were exposed through a photographic negative to actinic radiation from an arc lamp, whereby the radiation-struck areas of the coating were insolubilized. The exposed plates were then successfully developed with each of the above developing solutions. Thereafter, the plates were mounted on printing machines and satisfactory prints were obtained therefrom.

EXAMPLE 10

| | | |
|---|---|---|
| 2-methoxy-ethyl acetate | cc. | 100 |
| Polyoxyethylene sorbitan monopalmitate | cc. | 50 |
| Citric acid | g. | 0.5 |
| Solvent Blue, Colour Index No. 36 | g. | 0.2 |

EXAMPLE 11

| | | |
|---|---|---|
| 2-methoxy-ethyl acetate | cc. | 200 |
| Polyoxyethylene sorbitan monopalmitate | cc. | 50 |
| Phosphoric acid S.G. 1.75 | cc. | 0.1 |
| Dispersion of Pigment Red, Colour Index No. 12 | cc. | 10 |

EXAMPLE 12

| | | |
|---|---|---|
| Dimethyl formamide | cc. | 60 |
| 3-methoxy-butyl acetate | cc. | 20 |
| Polyoxyethylene sorbitan monolaurate | cc. | 20 |
| Phosphoric acid S.G. 1.75 | cc. | 0.1 |
| Solvent Red, Colour Index No. 24 | g. | 0.2 |

Presensitized photolithographic printing plates, having a colourless photosensitive coating thereon, but otherwise the same as those described in copending U.S. patent application No. 639,612 were exposed through a photographic negative to actinic radiation from an arc lamp whereby the radiation-struck areas of the coating are insolubilized. The exposed plates were then successfully developed with developing solutions of Examples 10, 11 and 12. Thereafter, the plates were mounted on printing machines and satisfactory prints were obtained therefrom.

What is claimed is:

1. In a process for developing and desensitizing an image-wise exposed presensitized photolithographic printing plate presensitized with a photopolymerizable resin ester of an unsaturated acid, the improvement comprising treating said plate with a developer solution comprising a solvent which selectively removes the non-light-struck areas of said image-wise exposed photopolymerizable resin ester of an unsaturated acid, a non-colloidal acid desensitizer as sole desensitizer for the non-image areas of the plate, and a surface active agent to retain the non-light-struck photopolymerizable resin removed during development, the volumetric ratio of said solvent to said surface active agent being in the range of from 3 to 2 to 9 to 1.

2. A process as claimed in claim 1, in which the volumetric ratio of said solvent to said surface active agent is in the range of from 2:1 to 5:1.

3. A process as claimed in claim 1, wherein the low molecular weight desensitizer is selected from the group consisting of citric acid, oxalic acid, phosphoric acid and sulphuric acid.

4. A process as claimed in claim 1, in which the solvent is selected from the group consisting of a glycol ether ester, an amide, an alcohol, a hydrocarbon and a chlorinated hydrocarbon, either singly or two or more in admixture.

5. A process as claimed in claim 1, wherein the surface active agent is selected from the group consisting of an alkylaryl sulphonic acid and a salt thereof, a tertiary amine condensation product of a fatty amine and ethylene oxide, polyoxyethylene sorbitan monopalmitate, a polyoxyethylene glyceride ether and a polyoxyethylene condensate of an alcohol, a higher fatty alcohol or an alkyl phenol.

References Cited

UNITED STATES PATENTS

| | | | |
|---|---|---|---|
| 2,544,905 | 3/1951 | Van Deusen | 96—36 |
| 3,376,138 | 4/1968 | Giangulano et al. | 96—36.3 |
| 3,406,065 | 10/1968 | Uhlig | 96—36.3 |
| 3,471,290 | 10/1969 | Amidon et al. | 96—36 |
| 3,399,994 | 9/1968 | Watkinson et al. | 96—48 |

NORMAN G. TORCHIN, Primary Examiner

E. C. KIMLIN, Assistant Examiner

U.S. Cl. X.R.

96—36